(12) United States Patent
Ciesla et al.

(10) Patent No.: US 8,704,790 B2
(45) Date of Patent: Apr. 22, 2014

(54) USER INTERFACE SYSTEM

(75) Inventors: Craig Michael Ciesla, Mountain View, CA (US); Micah B Yairi, Daly City, CA (US); Nathaniel Mark Saal, Palo Alto, CA (US)

(73) Assignee: Tactus Technology, Inc., Fremont, CA (US)

( * ) Notice: Subject to any disclaimer, the term of this patent is extended or adjusted under 35 U.S.C. 154(b) by 165 days.

(21) Appl. No.: 13/278,125

(22) Filed: Oct. 20, 2011

(65) Prior Publication Data

US 2012/0098789 A1   Apr. 26, 2012

Related U.S. Application Data

(60) Provisional application No. 61/405,140, filed on Oct. 20, 2010.

(51) Int. Cl.
*G06F 3/041* (2006.01)
(52) U.S. Cl.
USPC ............ 345/173; 345/156; 345/174; 715/702
(58) Field of Classification Search
USPC .................. 345/156, 168, 173, 174; 434/114; 340/407.1, 407.2, 4.12; 341/22, 27; 715/701, 702
See application file for complete search history.

(56) References Cited

U.S. PATENT DOCUMENTS

| | | | |
|---|---|---|---|
| 3,659,354 A | 5/1972 | Sutherland | |
| 3,759,108 A | 9/1973 | Borom et al. | |
| 3,780,236 A | 12/1973 | Gross | |
| 3,818,487 A | 6/1974 | Brody et al. | |
| 4,109,118 A | 8/1978 | Kley | |
| 4,209,819 A | 6/1980 | Seignemartin | |
| 4,290,343 A | 9/1981 | Gram | |
| 4,307,268 A | 12/1981 | Harper | |
| 4,467,321 A | 8/1984 | Volnak | |

(Continued)

FOREIGN PATENT DOCUMENTS

| | | |
|---|---|---|
| JP | 10255106 | 9/1998 |
| JP | 2006268068 A | 10/2006 |

(Continued)

OTHER PUBLICATIONS

Optical Society of America, Optics Express; vol. 12, No. 11. May 31, 2004, 7 Pages, Jeong, Ki-Hun , et al. "Tunable Microdoublet Lens Array".

(Continued)

*Primary Examiner* — Koosha Sharifi-Tafreshi
(74) *Attorney, Agent, or Firm* — Jeffrey Schox; Peter Miller (57) ABSTRACT

One embodiment of the user interface system comprises: a volume of fluid; a tactile layer; a retaining wall substantially impermeable to the fluid; a permeable layer; a displacement device; and a touch sensor. The tactile layer, with a back surface, defines a second region, operable between: a retracted state, wherein the second region is substantially flush with a first region; and an expanded state, wherein the second region is substantially proud of the first region. The permeable layer, joined to the back surface of the first region, includes a plurality of fluid ports that communicate a portion of the fluid through the permeable layer to the back surface of the second region. The displacement device directs the fluid through the fluid ports to the back surface to transition the second region from the retracted state to the expanded state. The touch sensor detects a user touch on the tactile layer.

26 Claims, 6 Drawing Sheets

(56) References Cited

U.S. PATENT DOCUMENTS

| | | | |
|---|---|---|---|
| 4,477,700 | A | 10/1984 | Balash et al. |
| 4,517,421 | A | 5/1985 | Margolin |
| 4,700,025 | A | 10/1987 | Hatayama et al. |
| 4,920,343 | A | 4/1990 | Schwartz |
| 5,194,852 | A | 3/1993 | More et al. |
| 5,195,659 | A | 3/1993 | Eiskant |
| 5,212,473 | A | 5/1993 | Louis |
| 5,222,895 | A * | 6/1993 | Fricke .......................... 434/113 |
| 5,286,199 | A | 2/1994 | Kipke |
| 5,412,189 | A | 5/1995 | Cragun |
| 5,459,461 | A | 10/1995 | Crowley et al. |
| 5,666,112 | A | 9/1997 | Crowley et al. |
| 5,717,423 | A | 2/1998 | Parker |
| 5,729,222 | A | 3/1998 | Iggulden et al. |
| 5,742,241 | A | 4/1998 | Crowley et al. |
| 5,754,023 | A | 5/1998 | Roston et al. |
| 5,766,013 | A | 6/1998 | Vuyk |
| 5,767,839 | A | 6/1998 | Rosenberg |
| 5,835,080 | A | 11/1998 | Beeteson et al. |
| 5,889,236 | A | 3/1999 | Gillespie et al. |
| 5,943,043 | A | 8/1999 | Furuhata et al. |
| 5,977,867 | A | 11/1999 | Blouin |
| 5,982,304 | A | 11/1999 | Selker et al. |
| 6,067,116 | A | 5/2000 | Yamano et al. |
| 6,154,198 | A | 11/2000 | Rosenberg |
| 6,154,201 | A | 11/2000 | Levin et al. |
| 6,160,540 | A | 12/2000 | Fishkin et al. |
| 6,169,540 | B1 | 1/2001 | Rosenberg et al. |
| 6,218,966 | B1 | 4/2001 | Goodwin et al. |
| 6,243,074 | B1 | 6/2001 | Fishkin et al. |
| 6,243,078 | B1 | 6/2001 | Rosenberg |
| 6,268,857 | B1 | 7/2001 | Fishkin et al. |
| 6,271,828 | B1 | 8/2001 | Rosenberg et al. |
| 6,300,937 | B1 | 10/2001 | Rosenberg |
| 6,354,839 | B1 | 3/2002 | Schmidt et al. |
| 6,356,259 | B1 | 3/2002 | Maeda et al. |
| 6,359,572 | B1 | 3/2002 | Vale |
| 6,366,272 | B1 | 4/2002 | Rosenberg et al. |
| 6,369,803 | B2 | 4/2002 | Brisebois et al. |
| 6,414,671 | B1 | 7/2002 | Gillespie et al. |
| 6,437,771 | B1 | 8/2002 | Rosenberg et al. |
| 6,462,294 | B2 | 10/2002 | Davidson et al. |
| 6,469,692 | B2 | 10/2002 | Rosenberg |
| 6,486,872 | B2 | 11/2002 | Rosenberg et al. |
| 6,498,353 | B2 | 12/2002 | Nagle et al. |
| 6,509,892 | B1 | 1/2003 | Cooper et al. |
| 6,573,844 | B1 | 6/2003 | Venolia et al. |
| 6,636,202 | B2 | 10/2003 | Ishmael, Jr. et al. |
| 6,639,581 | B1 | 10/2003 | Moore et al. |
| 6,655,788 | B1 | 12/2003 | Freeman |
| 6,657,614 | B1 | 12/2003 | Ito et al. |
| 6,681,031 | B2 | 1/2004 | Cohen et al. |
| 6,686,911 | B1 | 2/2004 | Levin et al. |
| 6,697,086 | B2 | 2/2004 | Rosenberg et al. |
| 6,703,924 | B2 | 3/2004 | Tecu et al. |
| 6,788,295 | B1 | 9/2004 | Inkster |
| 6,819,316 | B2 | 11/2004 | Schulz et al. |
| 6,850,222 | B1 | 2/2005 | Rosenberg |
| 6,861,961 | B2 | 3/2005 | Sandbach et al. |
| 6,877,986 | B2 | 4/2005 | Fournier et al. |
| 6,881,063 | B2 | 4/2005 | Yang |
| 6,930,234 | B2 | 8/2005 | Davis |
| 6,937,225 | B1 | 8/2005 | Kehlstadt et al. |
| 6,975,305 | B2 | 12/2005 | Yamashita |
| 6,979,164 | B2 | 12/2005 | Kramer |
| 6,982,696 | B1 | 1/2006 | Shahoian |
| 6,995,745 | B2 | 2/2006 | Boon et al. |
| 7,027,032 | B2 | 4/2006 | Rosenberg et al. |
| 7,056,051 | B2 | 6/2006 | Fiffie |
| 7,061,467 | B2 | 6/2006 | Rosenberg |
| 7,064,655 | B2 | 6/2006 | Murray et al. |
| 7,081,888 | B2 | 7/2006 | Cok et al. |
| 7,096,852 | B2 | 8/2006 | Gregorio |
| 7,102,541 | B2 | 9/2006 | Rosenberg |
| 7,104,152 | B2 | 9/2006 | Levin et al. |
| 7,106,305 | B2 | 9/2006 | Rosenberg |
| 7,106,313 | B2 | 9/2006 | Schena et al. |
| 7,109,967 | B2 | 9/2006 | Hioki et al. |
| 7,112,737 | B2 | 9/2006 | Ramstein |
| 7,113,166 | B1 | 9/2006 | Rosenberg et al. |
| 7,116,317 | B2 | 10/2006 | Gregorio et al. |
| 7,124,425 | B1 | 10/2006 | Anderson, Jr. et al. |
| 7,129,854 | B2 | 10/2006 | Arneson et al. |
| 7,131,073 | B2 | 10/2006 | Rosenberg et al. |
| 7,136,045 | B2 | 11/2006 | Rosenberg et al. |
| 7,138,977 | B2 | 11/2006 | Kinerk et al. |
| 7,138,985 | B2 | 11/2006 | Nakajima |
| 7,143,785 | B2 | 12/2006 | Maerkl et al. |
| 7,144,616 | B1 | 12/2006 | Unger et al. |
| 7,148,875 | B2 | 12/2006 | Rosenberg et al. |
| 7,151,432 | B2 | 12/2006 | Tierling |
| 7,151,527 | B2 | 12/2006 | Culver |
| 7,151,528 | B2 | 12/2006 | Taylor et al. |
| 7,154,470 | B2 | 12/2006 | Tierling |
| 7,158,112 | B2 | 1/2007 | Rosenberg et al. |
| 7,159,008 | B1 | 1/2007 | Wies et al. |
| 7,161,276 | B2 | 1/2007 | Face |
| 7,161,580 | B2 | 1/2007 | Bailey et al. |
| 7,168,042 | B2 | 1/2007 | Braun et al. |
| 7,176,903 | B2 | 2/2007 | Katsuki et al. |
| 7,182,691 | B1 | 2/2007 | Schena |
| 7,191,191 | B2 | 3/2007 | Peurach et al. |
| 7,193,607 | B2 | 3/2007 | Moore et al. |
| 7,195,170 | B2 | 3/2007 | Matsumoto et al. |
| 7,196,688 | B2 | 3/2007 | Schena |
| 7,198,137 | B2 | 4/2007 | Olien |
| 7,199,790 | B2 | 4/2007 | Rosenberg et al. |
| 7,202,851 | B2 | 4/2007 | Cunningham et al. |
| 7,205,981 | B2 | 4/2007 | Cunningham |
| 7,208,671 | B2 | 4/2007 | Chu |
| 7,209,028 | B2 | 4/2007 | Boronkay et al. |
| 7,209,117 | B2 | 4/2007 | Rosenberg et al. |
| 7,209,118 | B2 | 4/2007 | Shahoian et al. |
| 7,210,160 | B2 | 4/2007 | Anderson, Jr. et al. |
| 7,215,326 | B2 | 5/2007 | Rosenberg |
| 7,216,671 | B2 | 5/2007 | Unger et al. |
| 7,218,310 | B2 | 5/2007 | Tierling et al. |
| 7,218,313 | B2 | 5/2007 | Marcus et al. |
| 7,233,313 | B2 | 6/2007 | Levin et al. |
| 7,233,315 | B2 | 6/2007 | Gregorio et al. |
| 7,233,476 | B2 | 6/2007 | Goldenberg et al. |
| 7,236,157 | B2 | 6/2007 | Schena et al. |
| 7,245,202 | B2 | 7/2007 | Levin |
| 7,249,951 | B2 | 7/2007 | Bevirt et al. |
| 7,250,128 | B2 | 7/2007 | Unger et al. |
| 7,253,803 | B2 | 8/2007 | Schena et al. |
| 7,253,807 | B2 | 8/2007 | Nakajima |
| 7,265,750 | B2 | 9/2007 | Rosenberg |
| 7,280,095 | B2 | 10/2007 | Grant |
| 7,283,120 | B2 | 10/2007 | Grant |
| 7,283,123 | B2 | 10/2007 | Braun et al. |
| 7,289,106 | B2 | 10/2007 | Bailey et al. |
| 7,289,111 | B2 | 10/2007 | Asbill |
| 7,307,619 | B2 | 12/2007 | Cunningham et al. |
| 7,308,831 | B2 | 12/2007 | Cunningham et al. |
| 7,319,374 | B2 | 1/2008 | Shahoian |
| 7,336,260 | B2 | 2/2008 | Martin et al. |
| 7,336,266 | B2 | 2/2008 | Hayward et al. |
| 7,339,572 | B2 | 3/2008 | Schena |
| 7,339,580 | B2 | 3/2008 | Westerman et al. |
| 7,342,573 | B2 | 3/2008 | Ryynanen |
| 7,355,595 | B2 | 4/2008 | Bathiche et al. |
| 7,369,115 | B2 | 5/2008 | Cruz-Hernandez et al. |
| 7,390,157 | B2 | 6/2008 | Kramer |
| 7,391,861 | B2 | 6/2008 | Levy |
| 7,397,466 | B2 | 7/2008 | Bourdelais et al. |
| 7,403,191 | B2 | 7/2008 | Sinclair |
| 7,432,910 | B2 | 10/2008 | Shahoian |
| 7,432,911 | B2 | 10/2008 | Skarine |
| 7,433,719 | B2 | 10/2008 | Dabov |
| 7,489,309 | B2 | 2/2009 | Levin et al. |
| 7,511,702 | B2 | 3/2009 | Hotelling |
| 7,522,152 | B2 | 4/2009 | Olien et al. |
| 7,545,289 | B2 | 6/2009 | Mackey et al. |

(56) References Cited

U.S. PATENT DOCUMENTS

| | | |
|---|---|---|
| 7,548,232 B2 | 6/2009 | Shahoian et al. |
| 7,551,161 B2 | 6/2009 | Mann |
| 7,561,142 B2 | 7/2009 | Shahoian et al. |
| 7,567,232 B2 | 7/2009 | Rosenberg |
| 7,567,243 B2 | 7/2009 | Hayward |
| 7,592,999 B2 | 9/2009 | Rosenberg et al. |
| 7,605,800 B2 | 10/2009 | Rosenberg |
| 7,609,178 B2 | 10/2009 | Son et al. |
| 7,671,837 B2 | 3/2010 | Forsblad et al. |
| 7,679,611 B2 | 3/2010 | Schena |
| 7,679,839 B2 | 3/2010 | Polyakov et al. |
| 7,688,310 B2 | 3/2010 | Rosenberg |
| 7,701,438 B2 | 4/2010 | Chang et al. |
| 7,728,820 B2 | 6/2010 | Rosenberg et al. |
| 7,733,575 B2 | 6/2010 | Heim et al. |
| 7,743,348 B2 | 6/2010 | Robbins et al. |
| 7,755,602 B2 | 7/2010 | Tremblay et al. |
| 7,808,488 B2 | 10/2010 | Martin et al. |
| 7,834,853 B2 | 11/2010 | Finney et al. |
| 7,843,424 B2 | 11/2010 | Rosenberg et al. |
| 7,864,164 B2 | 1/2011 | Cunningham et al. |
| 7,869,589 B2 | 1/2011 | Tuovinen |
| 7,890,257 B2 | 2/2011 | Fyke et al. |
| 7,890,863 B2 | 2/2011 | Grant et al. |
| 7,920,131 B2 | 4/2011 | Westerman |
| 7,924,145 B2 | 4/2011 | Yuk et al. |
| 7,944,435 B2 | 5/2011 | Rosenberg et al. |
| 7,956,770 B2 | 6/2011 | Klinghult et al. |
| 7,973,773 B2 | 7/2011 | Pryor |
| 7,978,181 B2 | 7/2011 | Westerman |
| 7,978,183 B2 | 7/2011 | Rosenberg et al. |
| 7,978,186 B2 | 7/2011 | Vassallo et al. |
| 7,979,797 B2 | 7/2011 | Schena |
| 7,982,720 B2 | 7/2011 | Rosenberg et al. |
| 7,986,303 B2 | 7/2011 | Braun et al. |
| 7,986,306 B2 | 7/2011 | Eich et al. |
| 7,989,181 B2 | 8/2011 | Blattner et al. |
| 7,999,660 B2 | 8/2011 | Cybart et al. |
| 8,002,089 B2 | 8/2011 | Jasso et al. |
| 8,004,492 B2 | 8/2011 | Kramer et al. |
| 8,013,843 B2 | 9/2011 | Pryor |
| 8,020,095 B2 | 9/2011 | Braun et al. |
| 8,022,933 B2 | 9/2011 | Hardacker et al. |
| 8,031,181 B2 | 10/2011 | Rosenberg et al. |
| 8,044,826 B2 | 10/2011 | Yoo |
| 8,047,849 B2 | 11/2011 | Ahn et al. |
| 8,049,734 B2 | 11/2011 | Rosenberg et al. |
| 8,059,104 B2 | 11/2011 | Shahoian et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,068,605 B2 | 11/2011 | Holmberg |
| 8,077,154 B2 | 12/2011 | Emig et al. |
| 8,077,440 B2 | 12/2011 | Krabbenborg et al. |
| 8,077,941 B2 | 12/2011 | Assmann |
| 8,094,121 B2 | 1/2012 | Obermeyer et al. |
| 8,094,806 B2 | 1/2012 | Levy |
| 8,103,472 B2 | 1/2012 | Braun et al. |
| 8,106,787 B2 | 1/2012 | Nurmi |
| 8,115,745 B2 | 2/2012 | Gray |
| 8,123,660 B2 | 2/2012 | Kruse et al. |
| 8,125,347 B2 | 2/2012 | Fahn |
| 8,125,461 B2 | 2/2012 | Weber et al. |
| 8,130,202 B2 | 3/2012 | Levine et al. |
| 8,144,129 B2 | 3/2012 | Hotelling et al. |
| 8,144,271 B2 | 3/2012 | Han |
| 8,154,512 B2 | 4/2012 | Olien et al. |
| 8,154,527 B2 | 4/2012 | Ciesla et al. |
| 8,159,461 B2 | 4/2012 | Martin et al. |
| 8,162,009 B2 | 4/2012 | Chaffee |
| 8,164,573 B2 | 4/2012 | Dacosta et al. |
| 8,169,306 B2 | 5/2012 | Schmidt et al. |
| 8,169,402 B2 | 5/2012 | Shahoian et al. |
| 8,174,372 B2 | 5/2012 | Da Costa |
| 8,174,495 B2 | 5/2012 | Takashima et al. |
| 8,174,508 B2 | 5/2012 | Sinclair et al. |
| 8,174,511 B2 | 5/2012 | Takenaka et al. |
| 8,178,808 B2 | 5/2012 | Strittmatter |
| 8,179,375 B2 | 5/2012 | Ciesla et al. |
| 8,179,377 B2 | 5/2012 | Ciesla et al. |
| 8,188,989 B2 | 5/2012 | Levin et al. |
| 8,195,243 B2 | 6/2012 | Kim et al. |
| 8,199,107 B2 | 6/2012 | Xu et al. |
| 8,199,124 B2 | 6/2012 | Ciesla et al. |
| 8,203,094 B2 | 6/2012 | Mittleman et al. |
| 8,207,950 B2 | 6/2012 | Ciesla et al. |
| 8,212,772 B2 | 7/2012 | Shahoian |
| 8,217,903 B2 | 7/2012 | Ma et al. |
| 8,217,904 B2 | 7/2012 | Kim |
| 8,224,392 B2 | 7/2012 | Kim et al. |
| 8,228,305 B2 | 7/2012 | Pryor |
| 8,232,976 B2 | 7/2012 | Yun et al. |
| 8,243,038 B2 | 8/2012 | Ciesla et al. |
| 8,253,052 B2 | 8/2012 | Chen |
| 8,253,703 B2 | 8/2012 | Eldering |
| 8,279,172 B2 | 10/2012 | Braun et al. |
| 8,279,193 B1 | 10/2012 | Birnbaum et al. |
| 8,378,797 B2 | 2/2013 | Pance et al. |
| 2001/0008396 A1 | 7/2001 | Komata |
| 2002/0106614 A1 | 8/2002 | Prince et al. |
| 2002/0110237 A1 | 8/2002 | Krishnan |
| 2003/0087698 A1 | 5/2003 | Nishiumi et al. |
| 2003/0179190 A1 | 9/2003 | Franzen |
| 2003/0206153 A1 | 11/2003 | Murphy |
| 2004/0056876 A1 | 3/2004 | Nakajima |
| 2004/0056877 A1 | 3/2004 | Nakajima |
| 2004/0164968 A1 | 8/2004 | Miyamoto |
| 2004/0178006 A1 | 9/2004 | Cok |
| 2005/0007349 A1 | 1/2005 | Vakil et al. |
| 2005/0231489 A1 | 10/2005 | Ladouceur et al. |
| 2005/0253816 A1 | 11/2005 | Himberg et al. |
| 2006/0087479 A1 | 4/2006 | Sakurai et al. |
| 2006/0098148 A1 | 5/2006 | Kobayashi et al. |
| 2006/0118610 A1 | 6/2006 | Pihlaja et al. |
| 2006/0214923 A1 | 9/2006 | Chiu et al. |
| 2006/0238495 A1 | 10/2006 | Davis |
| 2006/0238510 A1* | 10/2006 | Panotopoulos et al. ........ 345/168 |
| 2006/0256075 A1 | 11/2006 | Anastas et al. |
| 2007/0013662 A1 | 1/2007 | Fauth |
| 2007/0036492 A1 | 2/2007 | Lee |
| 2007/0085837 A1 | 4/2007 | Ricks et al. |
| 2007/0108032 A1 | 5/2007 | Matsumoto et al. |
| 2007/0122314 A1 | 5/2007 | Strand et al. |
| 2007/0165004 A1 | 7/2007 | Seelhammer et al. |
| 2007/0171210 A1 | 7/2007 | Chaudhri et al. |
| 2007/0229233 A1 | 10/2007 | Dort |
| 2007/0236469 A1 | 10/2007 | Woolley et al. |
| 2007/0247429 A1 | 10/2007 | Westerman |
| 2007/0273561 A1 | 11/2007 | Philipp |
| 2007/0296702 A1 | 12/2007 | Strawn et al. |
| 2007/0296709 A1 | 12/2007 | GuangHai |
| 2008/0010593 A1 | 1/2008 | Uusitalo et al. |
| 2008/0024459 A1 | 1/2008 | Poupyrev et al. |
| 2008/0136791 A1 | 6/2008 | Nissar |
| 2008/0138774 A1 | 6/2008 | Ahn et al. |
| 2008/0143693 A1 | 6/2008 | Schena |
| 2008/0150911 A1 | 6/2008 | Harrison |
| 2008/0165139 A1 | 7/2008 | Hotelling et al. |
| 2008/0248836 A1 | 10/2008 | Caine |
| 2008/0251368 A1 | 10/2008 | Holmberg et al. |
| 2008/0286447 A1 | 11/2008 | Alden et al. |
| 2008/0303796 A1 | 12/2008 | Fyke |
| 2009/0002328 A1 | 1/2009 | Ullrich et al. |
| 2009/0002337 A1 | 1/2009 | Chang |
| 2009/0009480 A1 | 1/2009 | Heringslack |
| 2009/0015547 A1 | 1/2009 | Franz et al. |
| 2009/0033617 A1 | 2/2009 | Lindberg et al. |
| 2009/0066672 A1* | 3/2009 | Tanabe et al. ................. 345/176 |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128503 A1 | 5/2009 | Grant et al. |
| 2009/0135145 A1 | 5/2009 | Chen et al. |

(56) References Cited

U.S. PATENT DOCUMENTS

| | | |
|---|---|---|
| 2009/0140989 A1 | 6/2009 | Ahlgren |
| 2009/0160813 A1 | 6/2009 | Takashima et al. |
| 2009/0167508 A1 | 7/2009 | Fadell et al. |
| 2009/0167509 A1 | 7/2009 | Fadell et al. |
| 2009/0167677 A1 | 7/2009 | Kruse et al. |
| 2009/0167704 A1 | 7/2009 | Terlizzi et al. |
| 2009/0174687 A1* | 7/2009 | Ciesla et al. ............... 345/174 |
| 2009/0181724 A1 | 7/2009 | Pettersson |
| 2009/0182501 A1 | 7/2009 | Fyke et al. |
| 2009/0195512 A1 | 8/2009 | Pettersson |
| 2009/0207148 A1 | 8/2009 | Sugimoto et al. |
| 2009/0243998 A1 | 10/2009 | Wang |
| 2009/0250267 A1 | 10/2009 | Heubel et al. |
| 2009/0303022 A1 | 12/2009 | Griffin et al. |
| 2010/0043189 A1 | 2/2010 | Fukano |
| 2010/0097323 A1 | 4/2010 | Edwards et al. |
| 2010/0109486 A1 | 5/2010 | Polyakov et al. |
| 2010/0177050 A1 | 7/2010 | Heubel et al. |
| 2010/0182245 A1 | 7/2010 | Edwards et al. |
| 2011/0001613 A1 | 1/2011 | Ciesla et al. |
| 2011/0018813 A1* | 1/2011 | Kruglick ............... 345/173 |
| 2011/0029862 A1 | 2/2011 | Scott et al. |
| 2011/0074691 A1 | 3/2011 | Causey et al. |
| 2011/0148807 A1 | 6/2011 | Fryer |
| 2011/0175844 A1 | 7/2011 | Berggren |
| 2011/0254709 A1 | 10/2011 | Ciesla et al. |
| 2012/0032886 A1 | 2/2012 | Ciesla et al. |
| 2012/0043191 A1 | 2/2012 | Kessler et al. |
| 2012/0056846 A1 | 3/2012 | Zaliva |
| 2012/0062483 A1 | 3/2012 | Ciesla et al. |
| 2012/0105333 A1 | 5/2012 | Maschmeyer et al. |
| 2012/0193211 A1 | 8/2012 | Ciesla et al. |
| 2012/0200528 A1 | 8/2012 | Ciesla et al. |
| 2012/0200529 A1 | 8/2012 | Ciesla et al. |
| 2012/0206364 A1 | 8/2012 | Ciesla et al. |
| 2012/0218213 A1 | 8/2012 | Ciesla et al. |
| 2012/0218214 A1 | 8/2012 | Ciesla et al. |
| 2012/0235935 A1 | 9/2012 | Ciesla et al. |
| 2012/0242607 A1 | 9/2012 | Ciesla et al. |
| 2012/0306787 A1 | 12/2012 | Ciesla et al. |
| 2013/0019207 A1 | 1/2013 | Rothkopf et al. |

FOREIGN PATENT DOCUMENTS

| | | |
|---|---|---|
| JP | 2006285785 A | 10/2006 |
| WO | 2004028955 A | 4/2004 |
| WO | 2008037275 A1 | 4/2008 |
| WO | 2009088985 A | 7/2009 |
| WO | 2010077382 A | 7/2010 |
| WO | 2010078596 A | 7/2010 |
| WO | 2010078597 A | 7/2010 |
| WO | 2011003113 A | 1/2011 |
| WO | 2011087816 A | 7/2011 |
| WO | 2011087817 A | 7/2011 |
| WO | 2011112984 A | 9/2011 |
| WO | 2011133604 A | 10/2011 |
| WO | 2011133605 A | 10/2011 |

OTHER PUBLICATIONS http://sharp-world.com/corporate/news/070831.html, Sharp Press Release, Aug. 31, 2007, 3 pages "Sharp Develops and Will Mass Produce New System LCD with Embedded Optical Sensors to Provide Input Capabilities Including Touch Screen and Scanner Functions".

* cited by examiner

USER INTERFACE SYSTEM

CROSS-REFERENCE TO RELATED APPLICATIONS

This application claims the benefit of US Provisional Application No. 61/405,140, filed 20 Oct. 2010, which is incorporated in its entirety by this reference.

This application is related to U.S. application Ser. No. 11/969,848 filed on 4 Jan. 2008 and entitled "System and Method for Raised Touch Screens", U.S. application Ser. No. 12/319,334 filed on 5 Jan. 2009 and entitled "User Interface System", and U.S. application Ser. No. 12/497,622 filed on 3 Jul. 2009 and entitled "User Interface System", which are all incorporated in their entirety by this reference.

TECHNICAL FIELD

This invention relates generally to the user interface field, and more specifically to a new and useful user interface in the touch-based interface field.

BACKGROUND

Touch-sensitive displays (e.g., touch screens) allow users to input commands and data directly into a display, which may be particularly useful in a variety of applications. Common applications for touch screens include consumer products such as cellular telephones and user interfaces for industrial process control. Depending on the specific application, these touch-sensitive displays are commonly used in devices ranging from small handheld PDAs, to medium sized tablet computers, to large industrial implements. It is often convenient for a user to input and read data on the same display. Unlike a dedicated input device, such as a keypad with discrete well-defined keys, most touch-sensitive displays are generally flat. As a result, touch-sensitive screens do not provide significant tactile guidance for one or more control "buttons". Instead, touch-sensitive displays rely on visual cues (e.g., displayed images) to guide user input.

Hence a serious drawback of touch-sensitive displays is the inherent difficulty a user faces when attempting to input data accurately because adjacent buttons are not distinguishable by feel. Improper keystrokes are common, which typically forces the user to focus both on the keypad (to properly input the next keystroke) and on the text input line (to check for errors); generally, the user is forced to keep his or her eyes on the display. The importance of tactile guidance is readily apparent in the competition between the Apple's iPhone and RIM's BlackBerry 8800. Touch-sensitive displays and physical hard buttons each have benefits and drawbacks, and digital devices generally incorporate one such component or the other.

Thus, there is a need in the touch-based interface field to create a new and useful interface, for a digital display, that incorporates tactile guidance for one or more control buttons.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
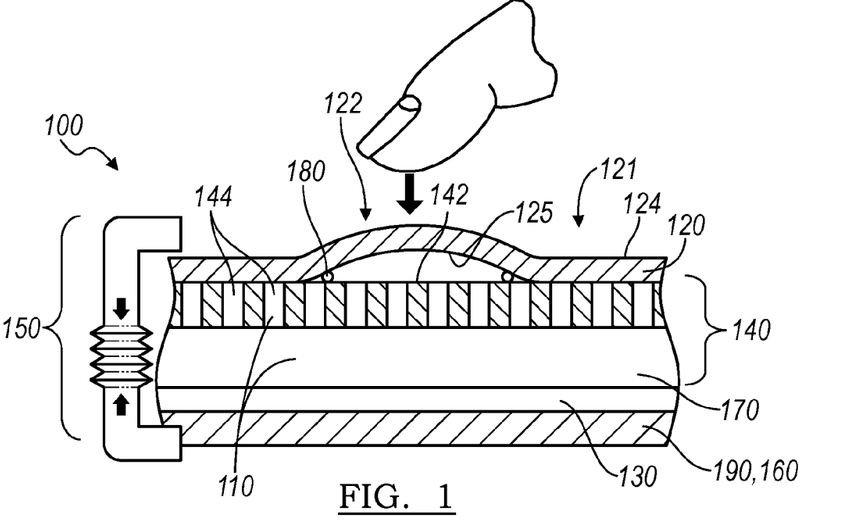
FIG. 1 is a schematic representation of a preferred embodiment of the user interface system with a proximal reservoir.

As shown in FIG. 1, the user interface system 100 of the preferred embodiment includes: a volume of fluid 110; a tactile layer 120; a retaining wall 130; a permeable layer 140; a displacement device 150; and a touch sensor 160. The tactile layer 120 defines an outer tactile surface 124 touchable by a user and a back surface 125 opposite the tactile surface 124; the tactile layer 120 further includes a first region 121 and a second region 122, wherein the second region 122 is operable between: a retracted state, wherein the second region 122 is substantially flush with the first region 121; and an expanded state, wherein the second region 122 is substantially proud of the first region 121. The retaining wall 130 is substantially impermeable to the fluid 110. The permeable layer 140, interposed between the tactile layer 120 and the retaining wall 130, is joined to the back surface 125 of the first region 121 and defines a support surface 142 below the second region 122; the permeable layer 140 further includes a plurality of fluid ports 144 that communicate a portion of the fluid 110 through the permeable layer 140 to the back surface 125 of the second region 122. The displacement device 150 cooperates with the retaining wall 130 to direct a portion of the fluid 110 through the fluid ports 144 to the back surface 125 to transition the second region 122 from the retracted state to the expanded state. The touch sensor 160 is coupled to the retaining wall 130 and detects a user touch on the tactile surface 124. The user interface system 100 may further comprise: a reservoir 170 that contains a portion of the volume of fluid 110; a digital display 190 that transmits an image to the user; an attachment point 180 that joins the tactile layer 120 to the permeable layer 140; and/or a pressure sensor that detects ambient air pressure proximal to the user interface system 100.

Figure 7A:
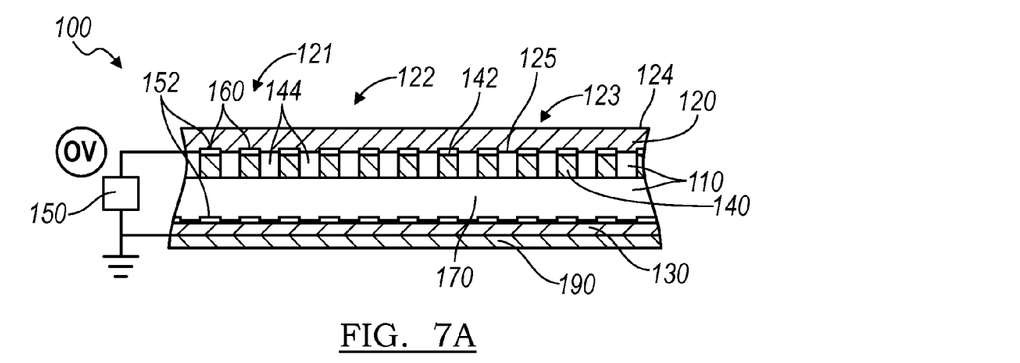
FIG. 7 includes schematic representations of various operable states of the preferred embodiment of the user interface system.
Figure 7B:
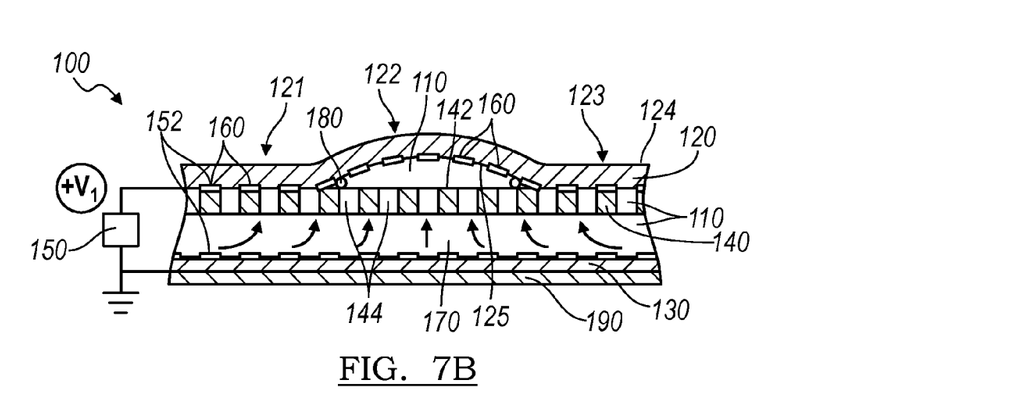
Figure 7C:
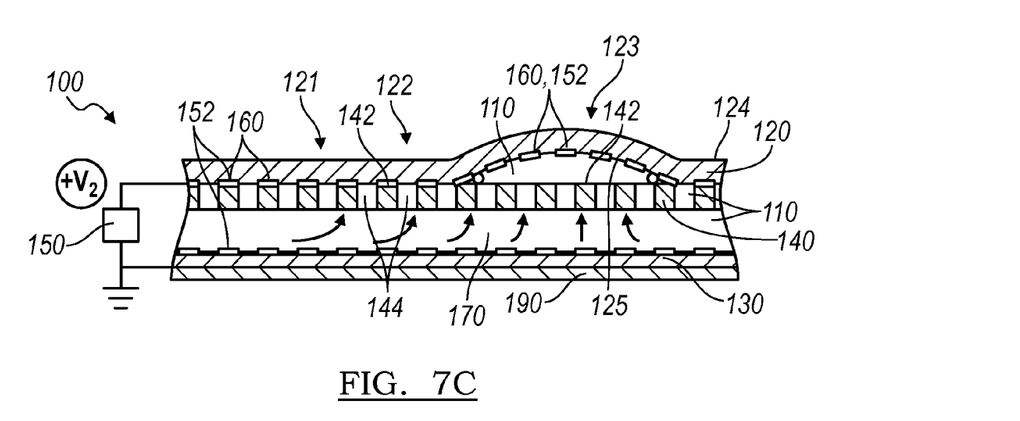
Figure 8:
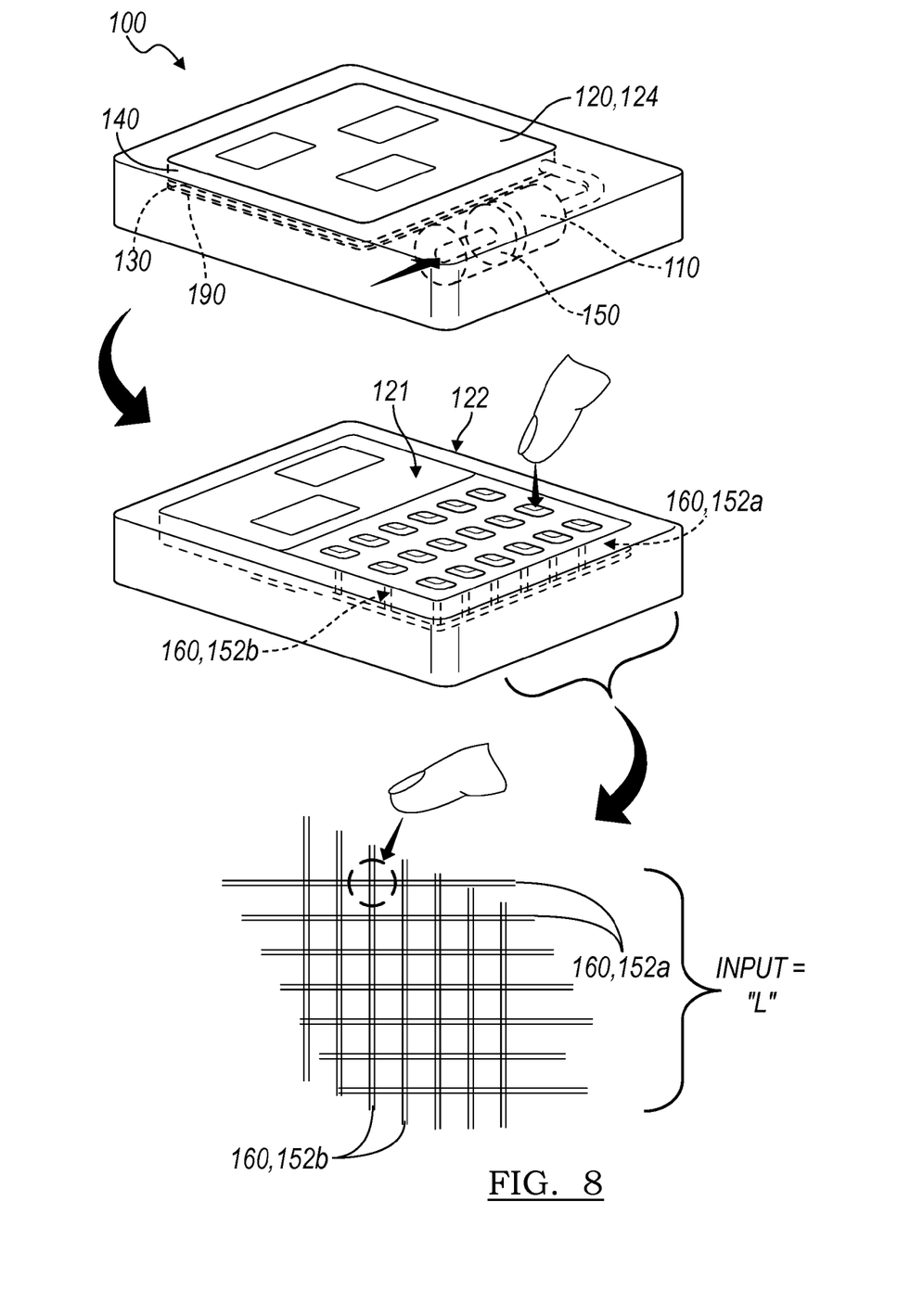
FIG. 8 is a perspective view of the preferred embodiment, incorporated into an electronic device with a digital display, and a flowchart of the operation of the preferred embodiment therein.

The user interface system 100 functions to deform the second region 122 of the tactile layer 120 to provide the user with tactile guidance when operating a device to which the user interface is coupled. The user interface system 100 is substantially similar to the user interface system described in U.S. patent application Ser. No. 12/319,334 titled "User Interface System" and/or U.S. patent application Ser. No. 12/497,622 titled "User Interface System," which are incorporated in their entirety by this reference. The user interface system 100 preferably cooperates with a visual guide (e.g., an image output by the digital display 190 and transmitted though the tactile surface 124) to provide a message, a choice, or any other suitable type of communication to the user, but may alternatively operate independently of a visual guide. The user interface system 100 preferably provides tactile guidance that is substantially adapted to a use of the device. The user interface system 100 may deform additional regions of the tactile layer 120, independently and/or concurrently with the second region 122, to provide further adaptability to the use of the device. FIGS. 7B and 7C depict a second region 122 and a third region 123 that are independently deformed. The user interface system 100 is preferably applied over an image that is static (e.g., a label) or dynamic (e.g., from the digital display 190); the user interface is preferably substantially transparent to permit transmission of the image through the user interface system 100. However, any other suitable optical property of the user interface system 100 may suffice. As shown in FIG. 8, the user interface system 100 of the preferred embodiment may be incorporated into an electronic device that includes a digital display, such as a vehicle console, a desktop computer, a laptop computer, a tablet computer, a television, a radio, a desk phone, a mobile phone, a smartphone, a PDA, a personal navigation device, a personal media player, a camera, or a watch. The user interface system 100 of the preferred embodiment may also be incorporated into an electronic device without a digital display, for example, onto a steering wheel of a vehicle, a remote control, or a keypad. The user interface system 100 may, however, be incorporated in any suitable device that tactilely and/or visually interfaces with a user.

Figure 5:
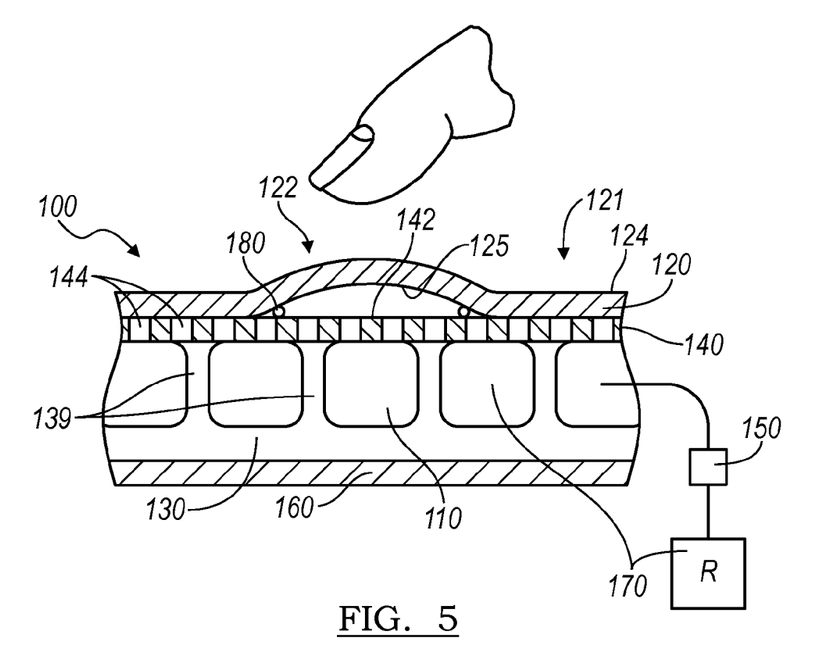
FIG. 5 is a schematic representation of an embodiment of the user interface system with a with a proximal reservoir and a remote reservoir.
Figure 6:
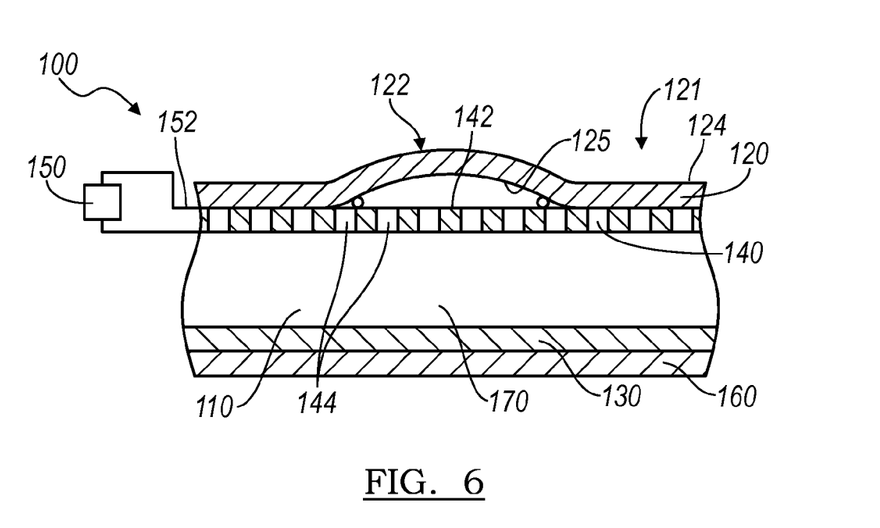
FIG. 6 is a schematic representation of an embodiment of the user interface system with a proximal reservoir and a displacement device that is an electrical pump.

The volume of fluid 110 of the preferred embodiment functions to transmit fluid pressure to the back surface 125 of the second region 122 to motivate a deformation of the second region 122. The fluid 110 preferably also functions to support the deformed (i.e., expanded) second region 122 when a user applies a force to the deformed second region 122. The fluid 110 is preferably a substantially incompressible fluid, such as oil, water, alcohol, and/or liquid paraffin, but may alternatively be a compressible fluid, such as air. However, the fluid 110 may be any other suitable type of fluid. A portion of the fluid 110 is preferably contained within the permeable layer 140, such as within the fluid ports 144 of the permeable layer 140 or within a cavity (e.g., reservoir) defined by the permeable layer 140. As shown in FIGS. 1 and 5, the user interface system 100 may also include a proximal and/or remote reservoir, respectively, that stores a portion of the fluid 110. However, the fluid may be arranged within the user interface system 100 in any other suitable arrangement. The fluid 110 is preferably substantially chemically inert in the presence of the tactile layer 120, the permeable layer 140, the displacement device 150, the touch sensor 160, the reservoir 170, and/or any other element of the user interface system 100 in contact with the fluid 110; specifically, the fluid 110 preferably does not corrode and is not corroded by any component of the user interface system 100 in contact with the fluid 110. Properties of the fluid 110 preferably remain substantially unchanged under normal operating conditions of the user interface system 100 or the device to which the user interface system 100 is applied. For example, if the user interface system 100 is used in an airplane, the properties of the fluid 110 preferably remain substantially unchanged between sea level and higher altitudes. However, the fluid 110 may have any other suitable chemical property.

Figure 2:
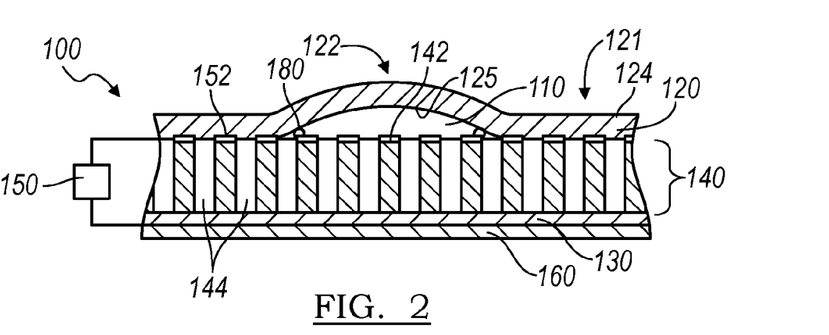
FIG. 2 is a schematic representation of an embodiment of the user interface system with in an expanded state.

As shown in FIGS. 2 and 5, the tactile layer 120 of the preferred embodiment functions to provide a tactile surface 124 that is touchable by the user and interfaces with a user in a tactile manner. The tactile layer 120 is preferably continuous, such that a user, when swiping a finger across the tactile surface 124, does not perceive any interruptions or seams therein. The tactile layer 120 is also preferably planar (i.e. flat) in the retracted state, but may alternatively form a non-planar (e.g., curved) surface. The tactile layer 120 may be arranged on a single plane, but may alternatively be arranged along a first plane and a second plane. For example, a portion of the tactile layer 120 may be arranged on a first surface of a device and a second portion of the tactile layer 120 may be arranged on a second surface of the device that is adjacent but not tangent to the first surface.

Figure 9:
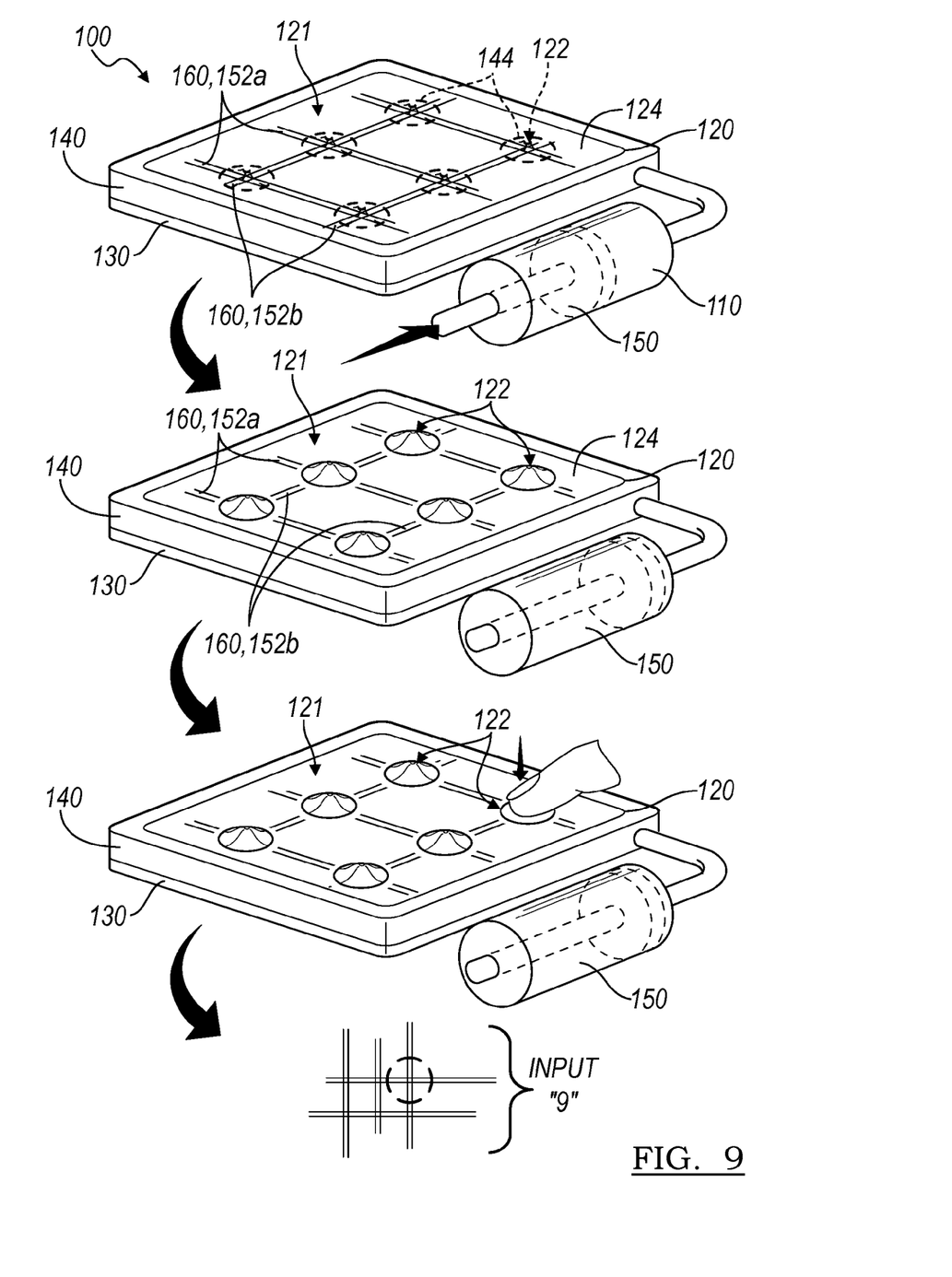
FIG. 9 is a perspective view of the preferred embodiment and a flowchart of the operation of the preferred embodiment therein.

As shown in FIG. 9, the tactile layer 120 further functions to define the second region 122 that outwardly deforms, from the retracted state to the expanded state, when fluid is displaced to the back surface 125 of the second region 122 (e.g., fluid pressure at the back surface 125 of the second region 122 increases above ambient air pressure); the second region 122 is preferably proud of the first region 121 in the expanded state and thus tactilely distinguishable, from the first deformable region 121, by the user. The tactile layer 120 also functions to define the first region 121 that remains substantially undeformed despite the state of the second region 122. The second region 122 preferably "relaxes" or "undeforms" back to the retracted state when the fluid 110 is drawn (or fluid pressure is released) from the back surface 125 of the second region 122; in the retracted state, the second region 122 is preferably flush with the first region 121 at the tactile surface 124. In a recessed state, the tactile layer 120 may also inwardly deform toward and/or conform to a concave contour defined by the permeable layer 140 (shown in FIG. 3); fluid drawn away from the back surface 125 of the second region 122 preferably pulls the second region 122 into the concave contour. The recessed state preferably provides the user with additional tactile feedback that is distinguishable from the retracted state and the expanded state. The second region 122 is preferably operable between the expanded and the retracted states but may also be operable solely between the expanded and recessed states or between all of the expanded, retracted, and recessed states; the second region 122 may, however, be operable in any other state.

The tactile layer 120 is preferably elastic to permit deformation of the second region 122 in the various states. In a first variation, the tactile layer 120 is relatively more elastic in specific areas (e.g., proximal to the second region 122) and relatively less elastic in other areas (e.g., proximal to the first region 121); the tactile layer 120 is therefore preferably more capable of deformation at the relatively more elastic areas. In a second variation, the tactile layer 120 is generally uniformly elastic. In a third variation, the tactile layer 120 includes or is comprised of a smart material, such as Nickel Titanium (commonly referred to as "Nitinol"). The tactile layer 120 is also preferably substantially optically transparent, but may alternatively be translucent or opaque. The tactile layer 120 preferably has the following properties: high light transmission; low haze; wide viewing angle; minimal back reflectance (e.g., in the variation in which the user interface system 100 is applied to a digital display 190 that emits light); scratch resistance; chemical resistance; stain resistance; gas and/or liquid impermeability; and smoothness (i.e. not tacky or rough to the touch). Also or alternatively, the surface may include coatings that provide any of these desired properties. The tactile layer 120 is preferably of a suitable elastic material, such as a polymer and/or silicon-based elastomer. Such suitable materials include: poly-dimethylsiloxane (PDMS); RTV silicone (e.g., RTV silicone 615); polyurethanes; thermoset plastics (e.g., polymethyl methacrylate (PMMA)); and photocurable solvent-resistant elastomers (e.g., perfluropolyethers). The tactile layer 120 may, however, be made of any suitable material. In one variation, the tactile layer 120 is a single homogeneous (e.g., of the same material throughout) layer less than 1 mm thick, and in a preferred variation, the tactile layer 120 is between 50 um and 200 um in thickness. In another version, the tactile layer 120 may be constructed using multiple layers and/or coatings of the same or different suitable materials and thicknesses.

The tactile layer 120 is preferably adjacent the permeable layer 140, and the first region 121 of the tactile layer 120 is preferably selectively attached, adhered or otherwise joined to the permeable layer 140 such that the first region 121 of the tactile layer 120 is retained against the permeable layer 140. However, the tactile layer 120 may be joined to the permeable layer 140 with a portion of the touch sensor 160 (e.g., an electrode) interposed between the permeable layer 140 and the tactile layer 120. The touch sensor 160 may be joined to the tactile layer 120 and thus deform with the tactile layer 120 such that the distance between the tactile sensor and the tactile surface 124, is substantially maintained. This may be particularly important in the variation of the touch sensor 160 that is a capacitive touch sensor 160.

The first region 121 preferably defines a border with the second region 122. As fluid is displaced through the fluid ports 144 toward the tactile layer 120, only fluid that is directed toward a portion of the tactile layer 120 not adhered to the permeable layer 140 (i.e. the second region 122) exits the permeable layer 140 and outwardly expands the free portion of the tactile layer 120 to produce a deformed region of the surface; the deformed region is preferably the second region 122 and preferably forms a button. The first region 121 (which is joined to the permeable layer 140) preferably restricts the fluid 110 from exiting the fluid ports 144 adjacent to the first region 121; the first region 121 (and other regions joined to the permeable layer 140) is therefore preferably not deformed by fluid drawn through the fluid ports 144. Thus, the perimeter of the second region 122 is preferably partially defined by a portion of the back surface 125 of the tactile layer 120 that is attached to the permeable layer 140 (e.g., the first region 121).

The first region 121 of the tactile layer 120 is preferably retained against the permeable layer 140 via an attachment point 180 (or plurality of attachment points); the attachment point 180 may be a series of continuous points, such as a line, a curve, or area, but may alternatively be a series of non-continuous points. The attachment point 180 may be formed via adhesive bonding, chemical bonding, welding, diffusion bonding, or by any other suitable attachment material and/or method. The attachment point 180 may comprise a volume of adhesive or other material arranged between the tactile layer 120 and the permeable layer 140; alternatively, the attachment point 180 may be formed by a chemical bond substantially between the back surface 125 of the tactile layer 120 and the permeable layer 140. Methods and/or materials that form the attachment point 180 preferably result in an attachment point with optical properties substantially similar to the optical properties of the tactile layer 120 and/or the permeable layer 140. The attachment point 180 preferably define a border between the first region 121 and the second region 122, wherein the first region 121 is retained against the permeable layer 140 and the second region 122 remains free to deform under changes in fluid pressure at the back surface 125 of the second region 122.

The permeable layer 140 of the preferred embodiment functions to define a support surface 142 that supports the second region 122 and to further define a plurality of fluid ports 144 that communicate a portion of the fluid 110 through the permeable layer 140 to the back surface 125 of the second region 122. A portion of the fluid 110, directed through any of the fluid ports 144 and toward the tactile surface 124, preferably outwardly deforms the second region 122.

The fluid ports 144 of the permeable layer 140 are preferably substantially sealed from the ambient environment, such as by the retaining wall 130, tactile layer 120, and/or perimeter wall; the fluid ports 144 are also preferably substantially filled with the fluid 110, which preferably prevents contamination and undesired mixing of the volume of fluid 110 with another fluid. In an example in which the fluid 110 is liquid paraffin, the fluid ports 144 are substantially filled with paraffin and the permeable layer 140 is substantially sealed from the environment, by the retaining wall 130 and the permeable layer 140, in order to prevent entry of air into the fluid ports 144; such contamination of the fluid 110 may cause bubbles within the liquid paraffin, leading to decreased transparency and/or increased obstruction to light transmission (i.e. the image) through the user interface system 100. In the variation that includes a digital display 190 that outputs a dynamic image to the user, such reduction of transparency and increased obstruction may be particularly deleterious to the operation of the user interface system 100.

The permeable layer 140 may be one of several variations. In a first variation, shown in FIG. 4, the permeable layer 140 is of a substantially porous material that defines a series of interconnected cavities that form the fluid ports 144; the cavities preferably contain a portion of the volume of fluid 110 and direct fluid through the permeable layer 140; the permeable layer 140 is therefore permeable to the fluid 110. In this variation of the permeable layer 140 that is porous, an electric field applied across a portion of the permeable layer 140 may effect a change in the porosity of the permeable layer 140; in this variation, the permeable layer 140 may thus perform the function of a valve in opening or closing flow of the fluid 110 toward or from the second region 122. However, a heating element may alternatively heat a portion of the permeable layer 140 to effect a change in the porosity of the portion of the permeable layer 140 and/or the viscosity of a portion of the fluid 110. In the variation that includes a reservoir 170 at least partially defined by the permeable layer 140, as shown in FIG. 4B, cavities open to the reservoir 170 may communicate the fluid 110 between the reservoir 170 and the tactile layer 120. The permeable layer 140 of this variation may be substantially sponge-like. The user interface system 100 is preferably substantially transparent such that an image may be transmitted through the user interface system 100; thus, the permeable layer 140 of this variation is preferably of a substantially transparent porous material, such as transparent silica aerogel, a transparent polymer, and/or a transparent ceramic. However, the permeable layer 140 of this first variation may be any other suitable type of porous material.

Figure 3:
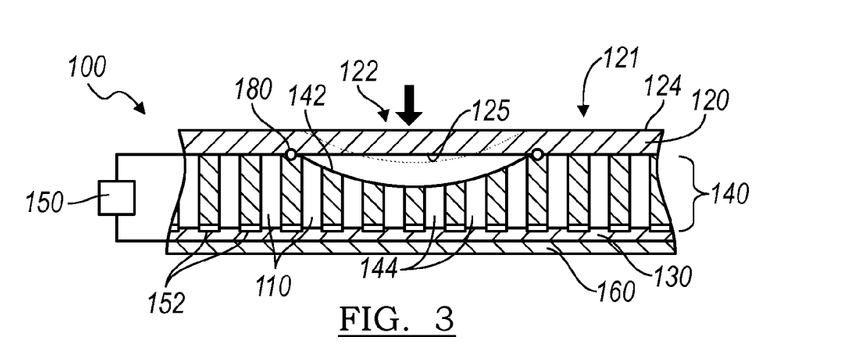
FIG. 3 is a schematic representation of an embodiment of the user interface system with a permeable layer defining a support surface with a concave contour proximal to the second region.

In a second variation, shown in FIG. 3, the permeable layer 140 defines a series of channels that form the fluid ports 144. The channels are preferably of a substantially cylindrical geometry; specifically the fluid ports 144 are preferably defined by channels that are substantially parallel bores of substantially circular cross-sections that pass fully through the permeable layer 140 substantially normal to the support surface 142. However, the channels (i.e. fluid ports 144) may be of any other geometry or cross-section. The channels are preferably substantially small enough to be substantially tactilely imperceptible to the user. The channel may also be optically invisible to the user, thus minimizing optical distortion of an image transmitted through the permeable layer 140, though the fluid 110 may have an index of refraction substantially similar to that of the permeable layer 140 to minimize such optical distortion. The channels may also be so small so as to be undetectable to the human eye, even when filled with the fluid (e.g., gas, air, liquid) of a different optical property (e.g, index of refraction) than that of the permeable layer 140. In the variation that includes substantially cylindrical channels, each channel if preferably of a diameter less than 500 um, through each channel preferably has a maximum diameter of 100 um, or less than the maximum feature size distinguishable to the touch or by unaided sight. The channels may be machined into the permeable layer 140, such as through laser ablation, bulk machining, conventional drilling, or etching. Alternatively, the channels may be formed during the manufacture of the permeable layer 140, such as by processing the permeable layer 140 with a mold that incorporates channel-forming features. Alternatively, the permeable layer 140 may comprise a series of individual channels (e.g., tubes) bundled together and retained by a holding material such as an adhesive. However, any other suitable method of forming the channels within the permeable layer 140 may be used. Because the user interface system 100 is preferably capable of transmitting an image to the user, the permeable layer 140 of the second variation preferably comprises a substantially transparent material, such as: glass; an elastomer; a silicon-based organic polymer, such as poly-dimethylsiloxane (PDMS), or other polymer; a thermoset plastic such as polymethyl methacrylate (PMMA); or a photocurable, solvent-resistant elastomer such as perfluropolyether. However, the permeable layer 140 may be of any other suitable material or geometry.

The permeable layer 140 of the preferred embodiment also functions to define a support surface 142 adjacent to the second region 122. The support surface 142 is preferably rigid, thus providing a 'hard stop' that limits inward deformation of the second region 122 due to a force applied to the tactile surface 124 by the user. The support surface 142 therefore prevents the user from "pressing too far" into the tactile surface 124. The support surface 142 may extend beyond the second region 122 to similarly support any other region or area of the tactile layer 120. In the variation in which the permeable layer 140 retains the first region 121 in a substantially planar form and the support surface 142 (below the second region 122) is also substantially planar, the support surface 142 may prevent inward deformation of the second region 122 beyond the plane of the first region 121 due to a force applied to the tactile surface 124 by the user. Furthermore, the permeable layer 140 preferably cooperates with the tactile layer 120 to substantially reduce the size and/or number of "divots" or interruptions felt by the user when swiping a finger across the tactile surface 124, particularly along the second region 122 in the retracted state. The divots are preferably defined by the fluid ports 144, and the tactile layer 120 is preferably of a thickness substantially greater than the cross-section of the fluid ports 144 such that the tactile layer 120 cannot noticeably deform into a opening of a fluid port; the fluid ports 144 may therefore be imperceptible by the user. However, any other suitable arrangement of the permeable layer 140 and tactile layer 120 may be used.

The retaining wall 130 of the preferred embodiment functions to support the permeable layer 140 and to prevent the fluid from escaping the user interface system 100 opposite the permeable layer 140. The retaining wall 130 of the preferred embodiment therefore preferably functions to cooperate with the displacement device 150 to direct a portion of the fluid 110 through the fluid ports 144 to the back surface 125 of the second region 122. Specifically the arrangement of the retaining wall 130 prevents the fluid 110, displaced into the permeable layer 140, from exiting the permeable layer 140 opposite the tactile layer; the retaining wall 130 therefore directs the fluid 110 closes a potential exit point for the fluid and directs the fluid 110 toward the tactile layer. The retaining wall 130 is substantially impermeable to the fluid 110 such that the fluid 110 may not pass through the retaining wall 130. In a first variation, the retaining wall 130 is joined directly to the permeable layer 140 opposite the support surface 142. In this variation, the retaining wall 130 closes the fluid ports 144 opposite the support surface 142 such that fluid may not escape the permeable layer 140 opposite the support surface 142 when the displacement device 150 increases the fluid pressure within the permeable layer 140; by closing the fluid ports 144 on this side of the permeable layer 140, an increase in fluid pressure within the permeable layer 140 directs the fluid 110 toward the support surface 142 and outwardly expands the second region 122. For example, in the second variation of the permeable layer 140, the fluid ports 144 defined by the permeable layer 140 do not function to substantially enclose a portion of the fluid 110; therefore, the retaining wall functions to provide a bottom wall to each of the fluid ports 144 defined by the permeable layer 140, thus preventing undesired flow of fluid out of the permeable layer 140 from the side opposite the support surface. The retaining wall 130 thus facilitates containment of a portion of the fluid 110 within the permeable layer 140. In a second variation, the retaining wall 130 is coupled to but offset from the permeable layer 140 opposite the support surface 142, thus cooperating with the permeable region to at least partially define a reservoir 170 between the permeable layer 140 and the retaining wall 130; the reservoir 170 may be further defined, in part, by the perimeter wall. In this second variation, the retaining wall 130 substantially resists deformation due to a fluid pressure increase within the reservoir 170 (generated by the displacement device 150) and prevents fluid from escaping past the retaining wall 130, thus directing fluid through the permeable layer 140 and toward the back surface 125 of the second region 122 to expand the second region 122. However, the retaining wall 130 may be of any other geometry and/or arrangement.

The retaining wall 130 may be a coating applied to the permeable layer 140 opposite the tactile layer 120, such as a substantially transparent sealant deposited thereon, but may alternatively be a separate layer of substantial thickness, such as a glass or polycarbonate substrate arranged over a digital display and adhered to the permeable layer 140. The retaining wall 130 may also include standoffs and/or pillars, joined to the permeable layer 140 and retaining the retaining wall 130 substantially offset from the permeable layer 140. However, the retaining wall 130 may be of any other geometry and coupled to the permeable layer 140 by any other method.

The displacement device 150 preferably functions to displace fluid within the fluid ports 144 and toward the back surface 125 of the second region 122 to outwardly deform the second region 122 in the expanded state. The displacement device 150 may be any of several variations, including a mechanical pump (e.g., a positive displacement, an impulse, or a velocity pump), an electrical (e.g., electroosmotic) pump, a clamp, a plunger-type displacement device (shown in FIG. 9), or any other suitable device capable of displacing fluid. To transition the second region 122 from the retracted state to the expanded state, the displacement device 150 preferably generates an area of relatively high pressure within the permeable layer 140 substantially remote from the support surface 142; this preferably induces fluid flow toward a relatively low-pressure area proximal to the back surface 125 of the second region 122 (i.e. across a pressure gradient), thus expanding the second region 122. To transition the second region 122 from the expanded state to the retraced state (or from the retracted state to the recessed state), the displacement device 150 preferably generates an area of relatively low pressure within the permeable layer 140 substantially remote from the support surface 142; this preferably induces fluid flow away from the back surface 125 of the second region 122, thus retracting the second region 122. Therefore, the displacement device 150 directs a portion of the fluid 110 through the fluid ports 144 to the back surface 125 to transition the second region 122 from the retracted state to the expanded state, and the displacement device 150 directs a portion of the fluid 110 from the fluid ports 144 to transition the second region 122 from the expanded state to the retracted state and/or from the retracted state to the recessed state.

In a variation of the displacement device 150 that creates a fluid pressure gradient to motivate the fluid 110, the pressure gradient preferably dissipates as the second region 122 deforms to absorb a pressure change. Fluid pressure within the user interface system 100 preferably reaches a steady and constant state once the second region 122 is in the desired state (e.g., expanded, retracted, or recessed state); the displacement device 150 preferably maintains this fluid pressure within the system to retain the second region 122 in the desired state. In the variation of the user interface system 100 that includes a reservoir 170, the displacement device 150 may create a pressure gradient across the reservoir 170 and the fluid ports 144 to motivate the fluid 110 from the reservoir 170 to the fluid ports 144, or vice versa.

The displacement device 150 is preferably a positive displacement micro-pump, such as pump #MDP2205 from ThinXXs Microtechnology AG of Zweibrucken, Germany or pump #mp5 from Bartels Mikrotechnik GmbH of Dortmund, Germany. However, the displacement device 150 may be of any other suitable type. Suitable types of positive displacement pumps include rotary, reciprocating, gear, screw, progressing cavity, roots-type, peristaltic, plunger, diaphragm, or rope pumps. Suitable types of impulse pumps include hydraulic ram pumps, and suitable types of velocity pumps include radial- and axial-flow centrifugal pumps and educator-jet pumps.

Figure 4A:
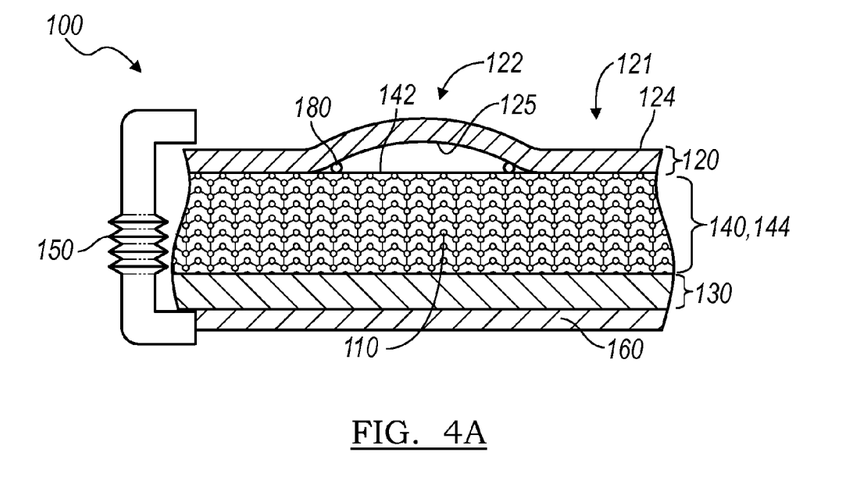
FIGS. 4A and 4B are schematic representations of an embodiment of the user interface system with a porous permeable layer and without and with a reservoir, respectively.
Figure 4B:
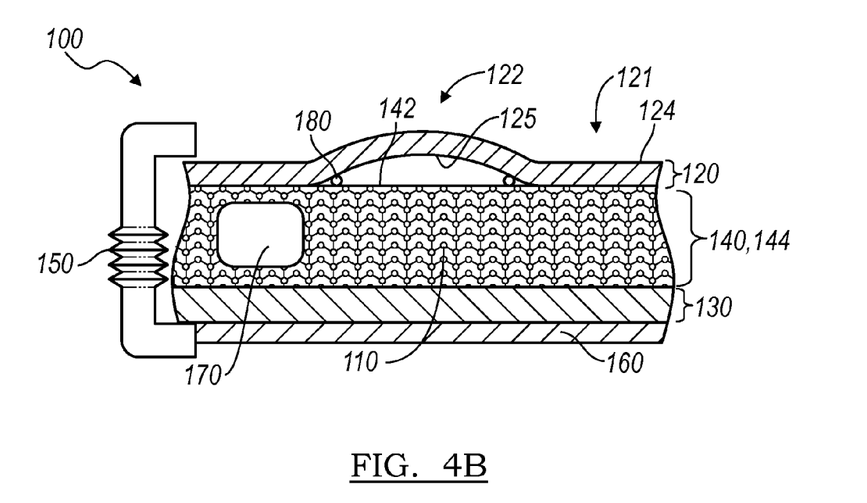

Alternatively, in the variation of the user interface system 100 that includes a reservoir 170 interposed between the permeable layer 140 and the retaining wall 130, the mechanical pump may comprise a clamp coupled to the permeable layer 140 and the support surface 142, as shown in FIGS. 1 and 4, wherein the clamp modifies the orientation of a portion of the retaining wall 130 relative to the permeable layer 140. This preferably decreases (or increases) the volume of the reservoir 170, thus increasing (or decreasing) fluid pressure within the reservoir 170 and motivating fluid toward (or from) the fluid ports 144 to expand (or retract) the second region 122.

Similarly, the displacement device 150 may deform the permeable layer 140 to displace a portion of the fluid 110. For example, the displacement device 150 may compress a portion of the permeable layer 140, thus decreasing the volume of the permeable layer 140 and motivating fluid through the fluid ports 144 to outwardly deform the second region 122; the displacement device 150 may thus "squeeze" the fluid 110 out of the permeable layer 140 and toward the tactile layer 120. The permeable layer 140 may be deformed uniformly; for example, the displacement device 150 may be a clamp arranged substantially across the permeable layer 140 opposite the support surface 142, wherein the clamp compresses the permeable layer 140 by motivating the retaining wall 130 toward the tactile layer 120. Alternatively, the displacement device 150 may compress only a portion of the permeable layer 140, such as the portion of the permeable layer 140 substantially proximal to the second region 122. In this variation, the displacement device 150 may compress the permeable layer 140 in substantially one direction, but may alternatively compress the permeable layer 140 in more than one direction, such as vertically and horizontally, or may deform the permeable layer 140 by twisting. However, other suitable deformations of the permeable layer 140 that displaces a portion of the fluid 110 from the permeable layer 140 to deform the second region 122 are also possible.

The displacement device 150 may also be an electrical pump that provides a voltage gradient across a portion of the permeable layer 140 to induce electroosmotic fluid flow through the fluid ports 144. Because viscous forces substantially hinder fluid flow through substantially small channels, electroosmotic-driven fluid flow may be advantageous in variations of the user interface system 100 in which the fluid ports 144 are substantially small in cross-section. As shown in FIG. 2, the displacement device 150 may generate a voltage gradient across the permeable layer 140 by generating a first voltage at a substantially transparent conductive trace 152 on the support surface 142 and a second (different) voltage on a transparent conductive trace on an opposite side of the permeable layer 140; the subsequent voltage gradient thus motivates fluid through the fluid ports 144. In the variation of the user interface system 100 in which the touch sensor 160 is a capacitive sensor arranged substantially between the permeable layer 140 and the tactile layer 120, within the permeable layer 140, or between the permeable layer 140 and the retaining wall 130, an electrode of the touch sensor 160 may also function as a portion of a conductive trace 152 of the electrical displacement device 150. However, the displacement device 150 may generate a voltage gradient across any other suitable portions or elements of the user interface system 100 to induce electroosmotic fluid flow.

Furthermore, the displacement device 150 may comprise a heating element that heats a portion of the fluid 110 (such as within the permeable layer 140) to expand the portion of the fluid no and thus expand the second region 122. In this example, a heat sink may also be included in the user interface system 100, wherein the heatsink draws heat out of the portion of the fluid 110 in order to cool the fluid and retract the second region 122.

The touch sensor 160 of the preferred embodiment functions to generate an output indicative of a user action proximal to the tactile surface 124. The output is preferably readable by a processor or other component within the device on which the user interface system 100 is arranged. The touch sensor 160 preferably recognizes a user action that is a finger touch on the tactile surface 124, but the touch sensor 160 may recognize contact by any other object, such as a stylus, a palm of the user, or multiple fingers of the user. Though the touch sensor 160 preferably detects a user action proximal to the tactile surface 124 at the second region 122 (e.g., wherein the user presses the expanded second region 122), the touch sensor 160 may also detect the user action proximal to any other region of the tactile layer 120.

The touch sensor 160 may detect the user action when the second region is solely in the retracted state, solely in the expanded state, solely in the recessed state. However, the touch sensor 160 preferably detects a user touch at the second region 122 regardless of the state of the second region 122, although the touch sensor 160 may also generate a unique output for a user touch proximate to the second region 122 in each of the retracted and expanded (and recessed) states. As explained above, the orientation of a portion of the touch sensor 160 may be manipulated in order to maintain the distance between the portion of the touch sensor 160 and the tactile layer 120 throughout the various states of the second region 122; this is preferably accomplished by joining a portion of the touch sensor 160 to the back surface 125 of the tactile layer 120, as shown in FIG. 7: FIG. 7A depicts the second region 122 in the retracted state with the portion of the touch sensor 160 adjacent to the support surface 142 of the permeable layer 140; FIG. 7B depicts the second region 122 in the expanded state with the portion of the touch sensor 160 joined to and deformed with the back surface of the second region 122.

The touch sensor 160 is preferably a capacitive touch sensor 160, as shown in FIGS. 8 and 9, wherein the touch sensor 160 may be a first conductive trace 152A that is a driving line and a second conductive trace 152B that is a sensing line; a user touch on the tactile surface 124 is thus preferably captured by the traces 152A, 152B by the touch sensor 160. However, the touch sensor 160 may sense the user touch via any other suitable technology, such as optical, resistive, surface acoustic wave, infrared, dispersive signal, or acoustic pulse recognition sensor technology.

The touch sensor 160 is preferably joined to the retaining wall 130 opposite the permeable layer 140, wherein the touch sensor 160 detects the user action through the retaining wall 130, the permeable layer 140, and the tactile layer 120. However, any portion of the touch sensor 160 may be interposed between, joined to, and/or physically coextensive with any other component of the user interface system 100; the touch sensor 160 may therefore be directly or indirectly coupled to the retaining wall 130. In the variation of the touch sensor 160 that is a capacitive touch sensor 160 comprising at least one layer of electrodes (e.g., a self capacitance touch sensor 160), a portion of the touch sensor 160 may be arranged within the permeable layer 140. In a first example, the permeable layer 140 is injection molded around an electrode layer of the touch sensor 160; in a second example, the permeable layer 140 comprises two permeable sheets adhered, one on each side, to the electrode layer of the touch sensor 160, thus forming a physically coextensive permeable layer 140 and touch sensor 160 portion. The touch sensor 160 may also comprise a layer bonded to the retaining wall 130 on one side and the permeable layer 140 on the opposite, or the touch sensor 160 may be a touch-sensitive display (i.e. the touch sensor 160 and display 190 are physically coextensive) coupled to the retaining wall 130. In the above example, the electrode layer is preferably permeable to the fluid, such as incorporating throughbores, -holes, or -slots. However, the touch sensor 160 may be of any other type, geometry, or arrangement, such as in the sensing systems as described in U.S. application Ser. No. 12/319,334 filed 5 Jan. 2009 and entitled "User Interface System," and U.S. application Ser. No. 12/497,622 filed on 3 Jul. 2009 and entitled "User Interface System and Method," which are incorporated in their entirety by this reference.

The user interface system 100 may further comprise a display 190, coupled to the retaining wall 130, that visually outputs an image to the user. To provide visual guidance to the user, the image is preferably of an input key substantially aligned with the second region 122. The display 190 is preferably a digital display, such as an LCD, LED, ELP, or other type of digital display commonly arranged within any of a vehicle console, a desktop computer, a laptop computer, a tablet computer, a television, a radio, a desk phone, a mobile phone, a smartphone, a PDA, a personal navigation device, a personal media player, a camera, or a watch. The digital display 190 is preferably joined to the retaining wall 130 opposite the permeable layer 140, but may alternatively be physically coextensive with the retaining wall 130, the touch sensor 160, and/or the permeable layer 140. The display 190 preferably generates the image, and the permeable layer 140 and the tactile layer 120 cooperatively communicate the image from the display 190 to the user; the retaining wall 130 and/or the touch sensor 160 may also cooperate to communicate the image to the user. The permeable layer 140 and the tactile layer 120 (and the retaining wall 130 and/or the touch sensor 160) therefore are substantially transparent, are substantially non-obstructive to light, and have substantially minimal internal reflectance.

The user interface system 100 may further comprise a perimeter wall, substantially encompassing the perimeter of the permeable layer 140, cooperating with the retaining wall 130 and the tactile layer 120 to retain the fluid 110 substantially within the permeable layer 140. The tactile layer 120 and the retaining wall 130 preferably substantially enclose the fluid no between the opposing broad surfaces of the permeable layer 140, and the perimeter wall preferably encircles the permeable layer 140 to prevent fluid from leaking from the perimeter sides of the permeable layer 140. This may be particularly important in the first variation of the permeable layer 140 (which comprises a substantially sponge-like material with interconnected cavities, as shown in FIG. 4): fluid directed toward an undeformable (first) region of the tactile layer 120 may be redirected substantially sideways through the interconnected cavities; though the fluid 110 is thus beneficially motivated toward a deformable (second) region of the tactile layer 120, the fluid 110 may also be directed out of the perimeter sides of the permeable layer 140, thus releasing fluid pressure within the permeable layer 140 and limiting outward deformation of the deformable region of the tactile layer 120. (Beneficially, however, in this variation and any other variation in which fluid ports 144 communicate a portion of the fluid 110 in a direction substantially perpendicular to the support surface 142, the displacement device 150 may increase fluid pressure within the permeable layer 140 proximal to both the first region 121 and the second region 122 but draw the fluid 110 only toward the second region 122 and thus deform only the second region 122.) The perimeter wall thus prevents such release of fluid pressure and is preferably incorporated in this variation (and potentially other variations) of the permeable layer 140. In another variation, the perimeter wall cooperates with any of the retaining wall 130, the permeable layer 140, and the electronic device to define the reservoir 170. The perimeter wall may be substantially independent of the permeable layer 140 but may also be integral with the permeable layer 140 or physically coextensive with the retaining wall 130. However, the perimeter wall may also be physically coextensive with the tactile layer 120, retaining wall 130, or any other element of the user interface system 100. In the variation in which the displacement device modifies the orientation of a portion of the retaining wall 130, the perimeter wall preferably deforms where necessary to accommodate the change in orientation.

As described above, the user interface system 100 may include a reservoir 170 that contains a portion of the fluid 110. The reservoir 170 is preferably a proximal reservoir that is substantially adjacent to the permeable layer 140, as shown in FIGS. 1 and 5, but may also be a remote reservoir, as shown in FIG. 5. As the fluid 110 is displaced toward the tactile layer 120, additional fluid is preferably provided to the permeable layer 140 by the reservoir 170; as the fluid no is displaced away from the tactile layer 120, the fluid 110 is preferably recollected by the reservoir 170. The reservoir 170 may also replenish fluid to the permeable layer 140, such as following a leak or other loss of the fluid 110, though the reservoir 170 may provide additional fluid for any other suitable function. The reservoir 170 is preferably coupled to the permeable layer 140 via the displacement device 150 (i.e. the displacement device 150 is arranged between the reservoir 170 and the permeable layer 140) such that the displacement device 150 draws fluid from the reservoir 170 and toward the permeable layer 140, and vice versa. Furthermore, the reservoir 170 may be substantially rigid such that the reservoir 170 does not substantially deform as the fluid 110 is drawn therefrom, but the reservoir 170 may alternatively be substantially deformable, such as in a variation of the reservoir 170 that is a pliable (e.g., plastic, silicone, or rubber) pouch that deforms as fluid is drawn from or into the reservoir 170. However, the reservoir 170 may be arranged in any other suitable fashion and take any other form.

The variation of the reservoir 170 that is a proximal reservoir 170 is preferably in direct fluid contact with the permeable layer 140, as shown in FIGS. 1 and 5. The proximal reservoir 170 may be coupled to (or partially defined by) the permeable layer 140 opposite the support surface 142, but may alternatively be a substantially large cavity within the permeable layer 140 and containing fluid accessible by any number of the fluid ports 144. The proximal reservoir 170 may also include support pillars 139 that support the proximal reservoir 170 and substantially maintain the shape of the reservoir 170, such as the support pillars 139 shown in FIG. 5. In the variation of the permeable layer 140 that is porous, the permeable layer 140 may accept fluid from any side; thus, the proximal reservoir 170 may be arranged in any suitable orientation to communicate the fluid 110 to any side of the permeable layer 140. The variation of the reservoir 170 that is a remote reservoir is preferably coupled to the permeable layer 140 (or an additional proximal reservoir) via a channel, but may be coupled using any other suitable element or method.

The reservoir 170 may also include a second displacement device 150 that displaces the fluid no within the user interface system 100. This preferably decreases the load on the displacement device 150 and may be particularly useful in the variation that includes a remote reservoir, wherein the fluid no must be displaced over a substantial distance. For example, the remote reservoir may be coupled to a second displacement device 150 that is a clamp, wherein the clamp may be manually operated to displace fluid toward the permeable layer 140. In this example, the clamp may be a hinge and/or slider on a mobile phone or any other suitable device such that, when actuated, fluid is drawn from the remote reservoir and motivated toward the permeable layer 140 (or vice versa). However, any other suitable type of second displacement device 150 may be used and may or may not be substantially similar to the displacement device 150. The second displacement device 150 may also be used in place of the displacement device 150.

The user interface system 100 may further comprise a pressure sensor that detects ambient air pressure (or barometric or atmospheric pressure) proximal to the user interface system 100. The pressure sensor may be of any type of pressure sensor, such as a piezoresistive, capacitive, electromagnetic, piezoelectric, optical, or potentiometric pressure sensor. In the retracted state, the displacement device 150 preferably adjusts the fluid pressure at the back surface 125 of the second region 122 to substantially match the ambient air pressure such that the second region 122 does not deform undesirably (i.e. deviate from flush with the first region 121). For example, in the retracted state, the displacement device 150 preferably reduces the fluid pressure at the back surface 125 of the second region 122, when the user interface system 100 is transferred from substantially sea level to a substantially high altitude, such that the second region 122 does not outwardly deform in the presence of reduced ambient air pressure at higher altitudes. The pressure sensor may also serve as a reference for the displacement device 150, wherein, in the expanded (or recessed) state, the displacement device 150 increases (or decreases) the pressure at the back surface 125 of the second region 122 by a pre-specified pressure above (or below) the ambient air pressure such that the second region 122 deforms substantially identically at various ambient air pressures. However, the pressure sensor may function and/or cooperate with the displacement device 150 in any other way.

As a person skilled in the art will recognize from the previous detailed description and from the figures and claims, modifications and changes can be made to the preferred embodiments of the invention without departing from the scope of this invention as defined in the following claims.

We claim:
1. A user interface system comprising:
a tactile layer defining a tactile surface a first region, and a deformable region adjacent the first region;
a permeable layer comprising an attachment area and a support surface adjacent the attachment area, the permeable layer defining a substantially uniform density of fluid ports across the attachment area and the support surface, the peripheral first region coupled to the attachment area and Mocking flow of a fluid through fluid ports within the attachment area, the deformable region arranged over and disconnected from the support surface;
a retaining wall coupled to the permeable layer opposite the tactile layer and impermeable to the fluid;
a displacement device configured to displace the fluid through fluid ports within the support surface by displacing a portion of the permeable layer relative to the retaining wall to transition the deformable region from a retracted setting to an expanded setting, the deformable region in contact with the support surface in the retracted setting, the first region elevated above the first region and lifted off of the support surface in the expanded setting; and
a sensor configured to output a signal corresponding to an input on the tactile surface.

2. The user interface system of claim 1, wherein the support surface defines a concave contour adjacent the deformable region, wherein the displacement device is configured to transition the deformable region into the expanded setting by displacing a portion of the retaining wall toward the portion of the permeable layer, and wherein the displacement device is configured to retract the deformable region into the concave contour in the retracted setting by displacing the portion of the retaining wall away from the permeable layer.

3. The user interface system of claim 1, wherein the retaining wall is offset from and cooperates with the permeable layer to define a reservoir containing the fluid, and wherein the displacement device is configured to displace the fluid from the reservoir into fluid ports in the permeable layer by displacing the portion of the permeable layer toward a portion of the retaining wall.

4. The user interface system of claim 3, wherein the displacement device is configured to modify an orientation of the portion of the retaining wall relative to the permeable layer to displace fluid from the reservoir.

5. The user interface system of claim 1, further comprising a first conductive trace arranged over the support surface and a second conductive trace coupled to the permeable layer opposite the support surface, wherein the displacement device is configured to generate a voltage differential across the first conductive trace and the second conductive trace to induce electroosmotic fluid flow through fluid ports within the support surface.

6. The user interface system of claim 1, wherein the permeable layer defines a substantially uniform density of fluid conduits throughout its thickness, the fluid conduits terminating in fluid ports at the attachment area and the support surface.

7. The user interface system of claim 1, wherein the tactile surface is substantially continuous across the first region and the deformable region, and wherein the first region and the deformable region are planar and flush in the retracted setting.

8. The user interface system of claim 1, wherein the sensor comprises a capacitive touch sensor.

9. The user interface system of claim 1, further comprising a digital display coupled to the retaining wall and configured to visually output an image of an input key substantially aligned with the deformable region, wherein the retaining wall, the permeable layer, and the tactile layer are substantially transparent.

10. The user interface system of claim 1, wherein the permeable layer defines a second support surface, wherein the tactile layer defines a second deformable region arranged over and disconnected from the second support surface, and wherein the displacement device is further configured to transition the second deformable region from a retracted setting to an expanded setting, independent of the deformable region, by displacing a second portion of the permeable layer relative to the retaining wall.

11. The user interface system of claim 6, wherein the permeable layer comprises a substantially porous material defining interconnected cavities that form the fluid conduits.

12. The user interface system of claim 6, wherein the fluid conduits comprise substantially parallel bores of substantially circular cross-sections passing fully through the permeable layer substantially normal to the attachment area and to the support surface.

13. The user interface system of claim 1, further comprising a perimeter wall impermeable to the fluid, encompassing a perimeter of the permeable layer, and cooperating with the retaining wall and the tactile layer to retain fluid within the permeable layer.

14. The user interface system of claim 13, wherein the perimeter wall and the permeable layer cooperate to define a reservoir containing the fluid.

15. A user interface system comprising:
a tactile layer defining a tactile surface, a first region, and a deformable region adjacent the first region;
a permeable layer comprising an attachment surface area and a support surface adjacent the attachment area, the permeable layer defining a substantially uniform density of fluid ports across the attachment area and the support surface, the first region coupled to the attachment area and blocking flow of a fluid through fluid ports within the attachment surface area, the deformable region arranged over and disconnected from the support surface;
a retaining wall coupled to the permeable layer opposite the tactile layer and impermeable to the fluid;
a displacement device configured to displace the fluid through fluid ports within the support surface to transition the deformable region from a retracted setting to an expanded setting, the deformable region in contact with the support surface in the retracted setting, the first region elevated above the first region and lifted off of the support surface in the expanded setting; and
a sensor configured to output a signal corresponding to an input on the tactile surface.

16. The user interface system of claim 15, wherein the permeable layer comprises a porous material defining interconnected cavities terminating in fluid ports across the attachment surface area and the support surface.

17. The user interface system of claim 16, wherein the interconnected cavities initiate at fluid inlets across the permeable layer opposite the attachment surface area and the support surface, wherein the retaining wall is offset from the permeable layer opposite the tactile layer and cooperates with the permeable layer to define a fluid reservoir, and wherein the displacement device is configured to pump fluid from the reservoir, into the fluid inlets, and out of fluid ports within the support surface to transition the deformable region from the retracted setting to the expanded setting.

18. The user interface system of claim 17, further comprising a first conductive trace arranged over the support surface and a second conductive trace coupled to the retaining wall, wherein the displacement device is configured to generate a voltage differential across the first conductive trace and the second conductive trace to displace fluid into the fluid inlets.

19. The user interface system of claim 15, wherein the permeable layer defines a substantially uniform density of bores passing through the permeable layer substantially normal to the support surface and to the attachment area, wherein the bores terminate at the fluid ports at the support surface and the attachment area.

20. The user interface system of claim 19, wherein the bores are of substantially circular cross-sections, and wherein the first region obstructs fluid flow through bores terminating in fluid ports within the attachment surface area.

21. The user interface system of claim 15, wherein the deformable region is flush with the first region in the retracted setting.

22. The user interface system of claim 15, wherein the sensor comprises a capacitive touch sensor.

23. A user interface system comprising:
a tactile layer defining a tactile surface, a first region, and a deformable region adjacent the first region;
a permeable layer comprising an attachment area and a support surface adjacent the attachment area, the permeable layer defining a substantially uniform density of fluid ports across the attachment area and the support surface, the first region coupled to the attachment area and blocking flow of a fluid through fluid ports within the attachment area, the deformable region arranged over and disconnected from the support surface;
a retaining wall coupled to the permeable layer opposite the tactile layer and impermeable to the fluid;
a first conductive trace arranged over the support face;
a second conductive trace coupled to the permeable layer opposite the support face;
a displacement device configured to transition the deformable region from a retracted setting to an expanded setting by generating a voltage differential across the first conductive trace and the second conductive trace to induce electroosmotic flow through the permeable layer, the deformable region in contact with the support surface in the retracted setting, the first region elevated above the first region and lifted off of the support surface in the expanded setting; and a sensor configured to output a signal corresponding to an input on the tactile surface.

24. The user interface system of claim 23, further comprising a digital display coupled to the retaining wall and configured to visually output an image of an input key substantially aligned with the deformable region, wherein the retaining wall, the permeable layer, the tactile layer, the first conductive trace, and the second conductive trace are substantially transparent.

25. The user interface system of claim 23, wherein the permeable layer comprises a porous material defining a substantially uniform density of interconnected cavities throughout its thickness, defines an interior surface opposite the attachment surface area and the support surface, and defines a substantially uniform density of fluid inlets across the interior surface, wherein the interconnected cavities are fluidly coupled to the fluid ports and the fluid inlets.

26. The user interface system of claim 1, wherein the tactile surface is substantially continuous across the first region and the deformable region, and wherein the first region and the deformable region are planar and flush in the retracted setting.

\* \* \* \* \*

UNITED STATES PATENT AND TRADEMARK OFFICE
CERTIFICATE OF CORRECTION

PATENT NO.         : 8,704,790 B2                               Page 1 of 1
APPLICATION NO.    : 13/278125
DATED              : April 22, 2014
INVENTOR(S)        : Craig Michael Ciesla et al.

It is certified that error appears in the above-identified patent and that said Letters Patent is hereby corrected as shown below:

In the Claims:
In column 14, line 24, add -- , -- between "surface" and "a"
In column 14, line 30, delete "peripheral"
In column 14, line 31, "Mocking" should read "blocking"
In column 15, line 54, delete "surface"
In column 15, line 60, delete "surface"
In column 16, line 11, replace "attachment surface area" with -- attachment area --
In column 16, line 14, delete "surface"
In column 16, line 56, replace "face" with -- surface --
In column 16, line 58, replace "face" with -- surface --

Signed and Sealed this
Twenty-first Day of October, 2014

Michelle K. Lee
*Deputy Director of the United States Patent and Trademark Office*